United States Patent [19]

Bloodworth, Jr. et al.

[11] 4,305,642
[45] Dec. 15, 1981

[54] OPTICAL FIBER TRANSITION DEVICE AND ASSEMBLY

[75] Inventors: Lonnie B. Bloodworth, Jr., Tucker; Christian Scholly, Atlanta; Thomas L. Williford, Jr., Lawrenceville, all of Ga.

[73] Assignee: Western Electric Company, Inc., New York, N.Y.

[21] Appl. No.: 104,245

[22] Filed: Dec. 17, 1979

[51] Int. Cl.³ .................................................. G02B 5/14
[52] U.S. Cl. .................................. 350/96.20; 81/9.51; 350/96.23
[58] Field of Search ............... 350/96.20, 96.22, 96.23; 226/196; 174/154, 155, 168, 169; 339/102 R, 103 M, 275 T, 107; 81/9.51

[56] References Cited

U.S. PATENT DOCUMENTS

| | | | |
|---|---|---|---|
| 3,864,018 | 2/1975 | Miller | 350/96.21 |
| 3,941,485 | 3/1976 | Madden | 356/159 |
| 4,057,448 | 11/1977 | Miller | 156/158 |
| 4,076,365 | 2/1978 | Ross et al. | 339/107 |
| 4,082,421 | 4/1978 | Auracher et al. | 350/96.22 |
| 4,096,010 | 6/1978 | Parham et al. | 156/179 |
| 4,129,468 | 12/1978 | Knab | 350/96.23 X |

FOREIGN PATENT DOCUMENTS 1622475 4/1970 Fed. Rep. of Germany ... 350/96.20
2715846 10/1978 Fed. Rep. of Germany ... 350/96.20

*Primary Examiner*—John D. Lee
*Attorney, Agent, or Firm*—D. D. Bosben

[57] ABSTRACT

A transition device (10) is provided to facilitate the forming of a lightguide ribbon cable unit (22) from a plurality of individual insulated light conductors (24). The light conductors (24), which each include a light-conductive glass fiber (12) surrounded by an inner layer (14) of insulation and an outer layer (16) of insulation, are mounted into converging channels (44) of the transition device (10), such that portions of the glass fibers which have been stripped of insulation extend from an exit end (50) of the device arranged in a parallel side-by-side array between two strips of pressure-sensitive adhesive tapes (18 and 20) to form the ribbon cable unit (22). The assembled transition device (10), ribbon cable unit (22) and light conductors (24) produce an optical fiber assembly (93).

9 Claims, 3 Drawing Figures

OPTICAL FIBER TRANSITION DEVICE AND ASSEMBLY

FIELD OF THE INVENTION

This invention relates generally to optical fibers and particularly to a transition device for the orderly transition of a plurality of individual light-conductive optical fibers into a planar array of fibers mounted in a flexible support medium.

BACKGROUND OF THE INVENTION

In known electronic apparatus in which optical signals are transmitted to and from the apparatus, it is necessary to connect individual insulated light-conductive glass fibers extending from the apparatus to light-conductive glass fibers of lightguide ribbon cable units extending to electronic apparatus at other locations. Each of the ribbon units includes a plurality of light-conductive fibers mounted in a side-by-side parallel array between two strips of adhesive tape. In the past, to connect the individual fibers extending from the apparatus to the array of fibers of one of the ribbon units, it was necessary to separate the plurality of fibers of the ribbon unit and individually connect the separated fibers to the individual fibers of the apparatus.

This method of connecting fibers usually created a disorderly array of fibers extending in a variety of directions from the ribbon units. Furthermore, a housing or other suitable covering had to be provided about the separated fibers of the ribbon units to protect the fragile fibers from potential damage. The resulting structure was generally bulky and not readily adaptable in a variety of applications.

Accordingly, a purpose of this invention is to provide a transition device to facilitate the orderly connection of individual light-conductive fibers, which may extend from associated electronic apparatus, to light-conductive fibers of a lightguide ribbon unit. The resulting optical fiber assembly provides ease of handling of the plurality of individual fibers and facilitates the connection of the individual fibers to the ribbon unit without disturbing the integrity of the ribbon unit.

U.S. Pat. No. 4,076,365 to Milton Ross discloses an electrical connector having a plurality of conductor spreading channels extending from an entry end of the device to an exit end of the device for receiving individual wire conductors of a multi-conductor cable. The individual conductors are pressed into the diverging channels to establish a particular spacing of the conductors at the exit end of the connector. Electrical contact means at the exit end of the connector are brought into engagement with the spaced wire conductors to facilitate electrical connection of the conductors to other electrical apparatus.

U.S. Pat. No. 4,096,010 to William Parham et al. discloses an apparatus for manufacturing optical fiber ribbon cable. A plurality of supply reels are arranged to pay out respective individual optical fibers. As the plurality of fibers advance in parallel coplanar paths, the fibers are passed over a fiber organizer which precisely spaces the fibers in a planar array. Simultaneously, the advancing array of fibers are embedded between two layers of pressure sensitive adhesive tape to form the ribbon cable.

SUMMARY OF THE INVENTION

This invention relates to the forming of a lightguide ribbon cable unit from a plurality of individual light-conductive fibers. To accomplish the foregoing, a transition device includes a support block having a plurality of fiber-receiving channels which converge toward one another substantially adjacent an exit end of the block from a spaced relationship at an entry end of the block. In forming the ribbon unit, a first flexible strip, forming one side of the ribbon unit, is secured at one end to the exit end of the block so as to extend outwardly therefrom. First portions of the light-conductive fibers are mounted into the fiber-receiving channels of the block such that second portions of the fibers extend from the exit end of the block in closely spaced relationship. The second portions of the light-conductive fibers are arranged in a parallel side-by-side array and are mounted longitudinally onto the first flexible strip. A second flexible strip then is moved into longitudinal engagement with the first flexible strip and bonded thereto, with the parallel array of fibers being encapsulated between the two opposed strips to form the ribbon cable unit. The first portions of the fibers and the portion of the ribbon cable unit secured to the block, then are encapsulated in the block.

DETAILED DESCRIPTION

Figure 1:
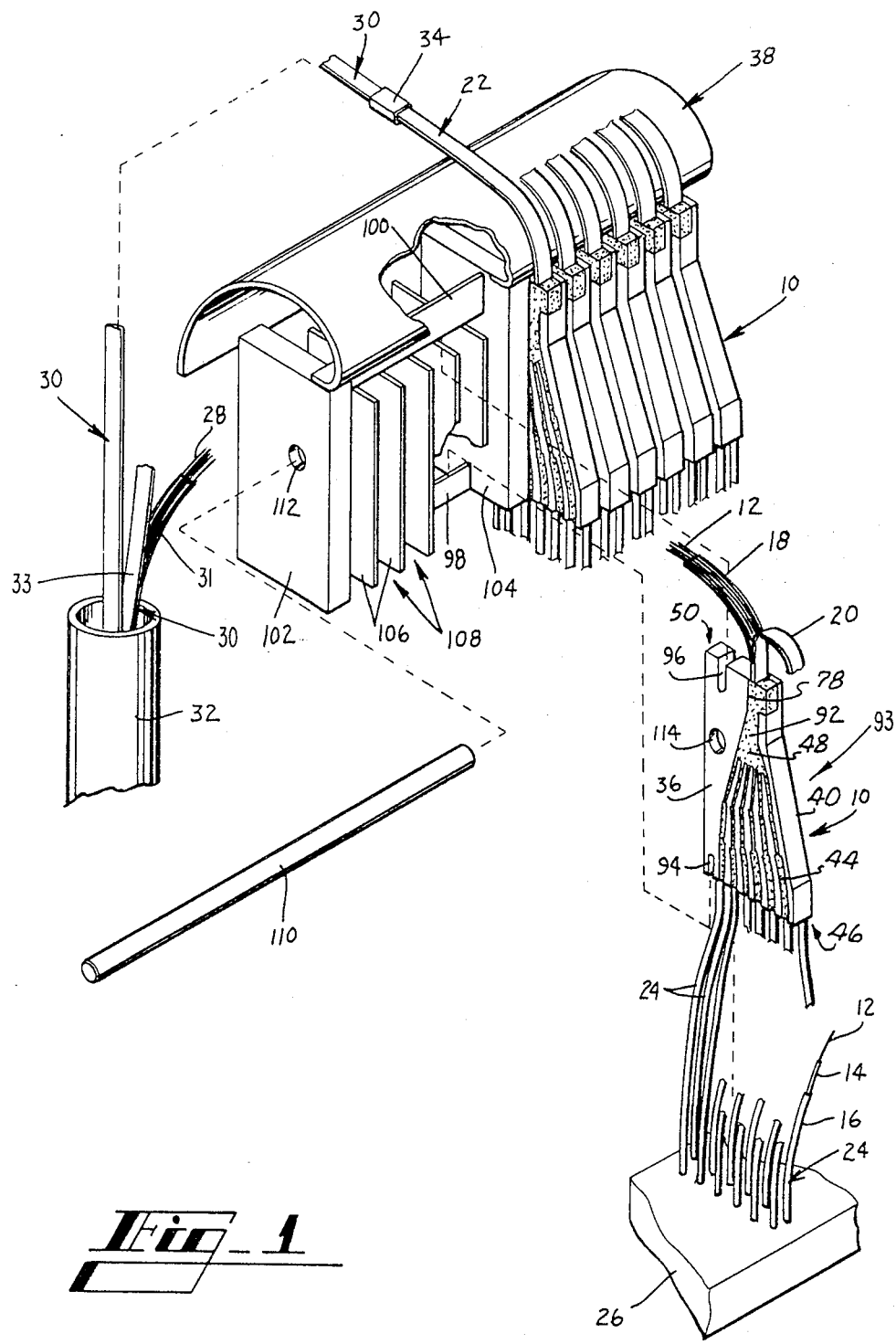
FIG. 1 is an isometric view showing a transition device in accordance with the invention in conjunction with other associated apparatus.

Referring to FIG. 1, the subject invention relates to a transition device, designated generally by numeral 10, provided for the orderly transition of respective ones of a plurality of light-conductive glass fibers 12 from a first configuration, wherein each fiber is surrounded by an inner layer of insulation 14 and an outer layer of insulation 16, to a second configuration wherein the fibers, which have been stripped of the insulation layers, are mounted in a side-by-side parallel array between first and second strips of pressure-sensitive adhesive tapes 18 and 20, forming a lightguide ribbon cable unit, designated generally by numeral 22. While a plurality of the transition devices 10 are shown in FIG. 1, since each transition device is of identical construction, only one is described herein.

More specifically, the transition device 10 facilitates the optical connection of the glass fibers 12, which form parts of a plurality of individual insulated light-conductors, designated generally by numeral 24 and extending from an electrical apparatus 26 such as a transmitter or receiver, to respective light-conductive glass fibers 28 of one of a plurality of lightguide ribbon units, designated generally by numeral 30, of an optical fiber cable 32. Each of the ribbon units 30 of the optical fiber cable 32 includes the plurality of light-conductive fibers 28 arranged in a parallel side-by-side array between two strips of pressure-sensitive adhesive tapes 31 and 33. The glass fibers 12 of the ribbon unit 22 extending from the transition device 10 are connected to the glass fibers 28 of the ribbon unit 30 of the optical cable 32 by utilizing an array connector 34 similar to that described in U.S. Pat. No. 3,864,018, the disclosure of which, by reference thereto, is incorporated herein.

Figure 2:
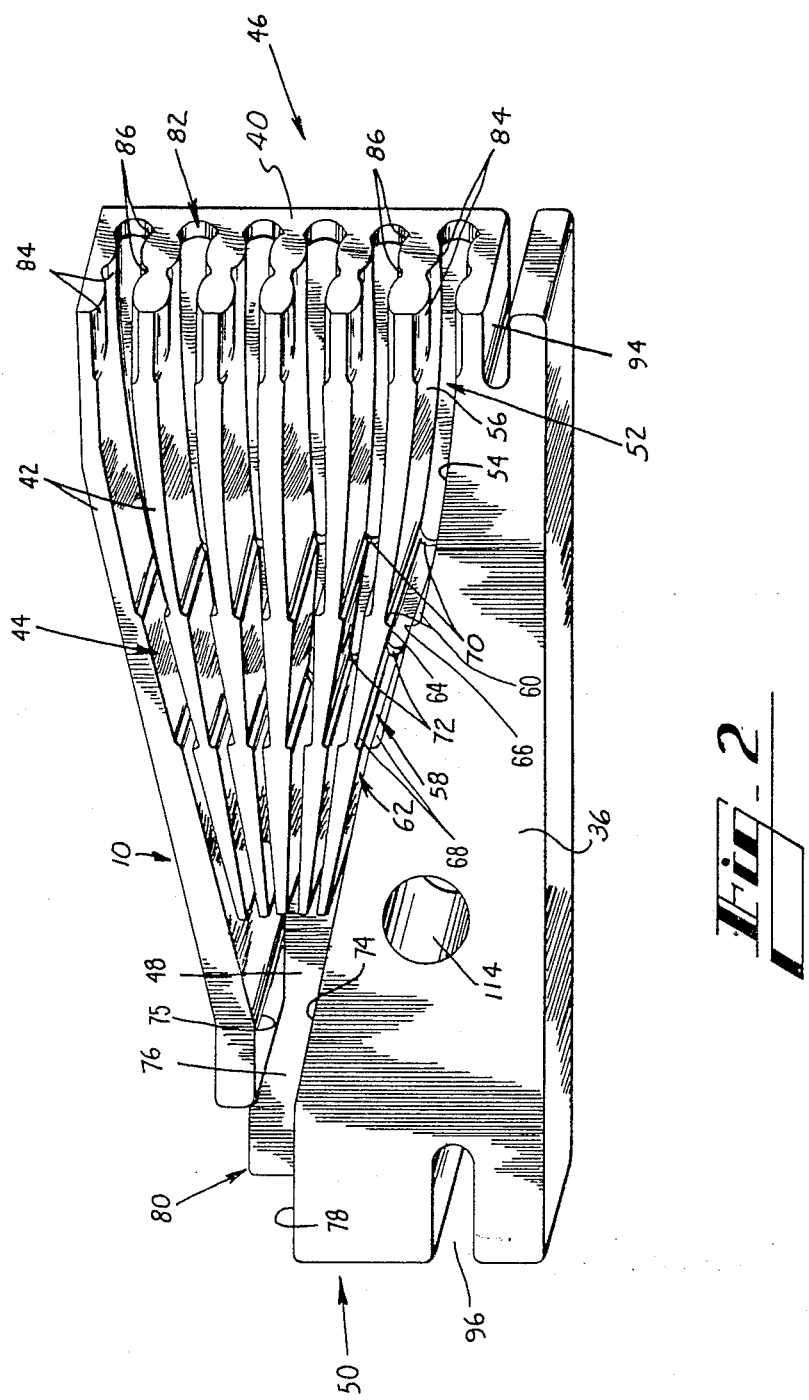
FIG. 2 is an isometric view showing details of the transition device in accordance with the invention.

The transition device 10 is in the form of an essentially planar support block of any suitable material (e.g., plastic) formed in any suitable manner (e.g., molding), and includes a mounting portion 36 to facilitate mounting the device into an assembly housing (FIG. 1), designated generally by numeral 38. Referring to FIG. 2, a back wall 40, integrally formed with the mounting portion 36, extends vertically in this figure from the mounting portion and has a plurality of elongated converging ribs 42 projecting therefrom. The ribs 42, together with the mounting portion 36 and one of the ribs opposed thereto, define a plurality of channels, designated generally by numeral 44, for receiving the individual light conductors 24 (FIGS. 1 and 3) therein.

In the transition device 10 disclosed, six of the channels 44 are shown and each channel is dimensioned to receive two of the light conductors 24 in side-by-side relationship within the channel. However, it is apparent that the number of the channels 44 can be increased or decreased and/or the depth of the channels can be modified to accommodate any number of light conductors 24 as desired.

Severe bending of the light-conductive glass fibers 12 decreases the intensity of optical signals carried by the light-conductive glass fibers. Therefore, the channels 44 of the device 10 preferably are dimensioned with a minimum radius on the order of three inches to limit the bend of the glass fibers 12 in the channels, whereby losses in intensity of the optical signals are insignificant when the signals pass through the portions of the fibers mounted in the device.

Referring to FIG. 2, the channels 44 extend from an entry end 46 of the transition device 10 and merge into a triangular exit cavity 48 located substantially adjacent an exit end 50 of the device. Each channel 44 includes an elongated channel entry section, designated generally by numeral 52, having opposed side walls 54 and 56, which are spaced apart a distance slightly greater than the diameter of the outer layer 16 (FIGS. 1 and 3) of insulation of the light conductors 24.

Figure 3:
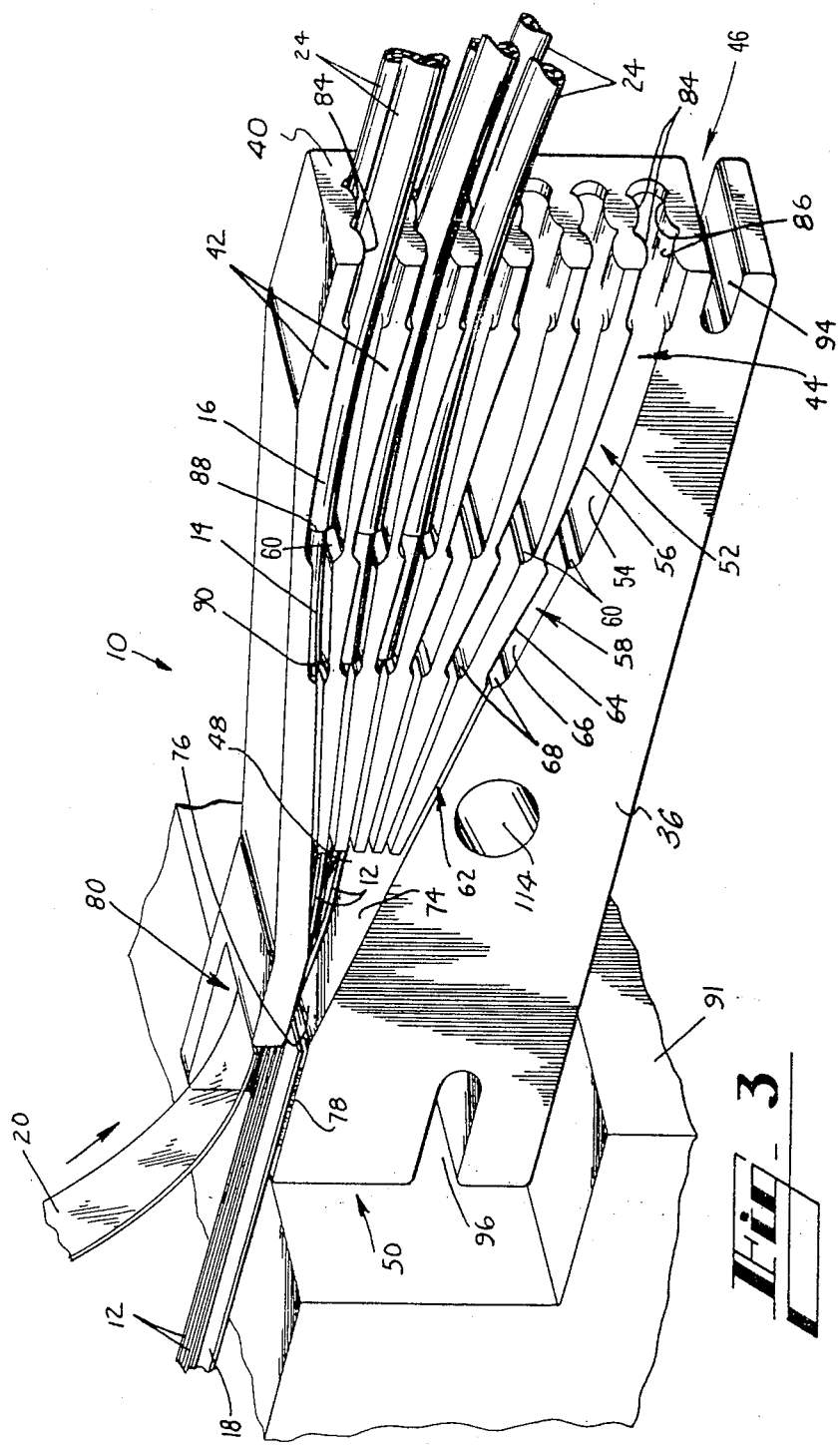
FIG. 3 is an isometric view showing the transition device with optical fibers mounted therein in accordance with the invention.

With further reference to FIGS. 2 and 3, the entry section 52 of each channel 44 terminates at a junction with a channel intermediate section designated generally by numeral 58, with the side walls 54 and 56 converging inward to define first stop surfaces 60 for abutting end portions of the outer insulation layers 16 of respective ones of the light conductors 24 thereagainst upon placement of the conductors into the channel. The channel intermediate section 58 has a width slightly wider than the inner layer 14 of insulation of the light conductors 24 and terminates at a junction with a channel exit section designated generally by numeral 62, at which junction side walls 64 and 66 of the channel intermediate section 58 converge inward to define second stop surfaces 68 for abutting end portions of the inner layers of insulation of the light conductors thereagainst.

The back wall 40 of the transition device 10 is stepped upward in each channel 44, as shown in FIG. 2, at the junction of the channel entry section 52 and the channel intermediate section 58, and at the junction of the channel intermediate section and the channel exit section 62, to define first and second stops 70 and 72, respectively, also for abutting end portions of the insulating layers 16 and 14 of the light conductors 24 thereagainst.

Referring again to FIG. 2, an inner wall section 74 of the mounting portion 36, and an inner wall section 75 of the outermost rib 42 of the transition device 10 adjacent the exit end 50 of the device, which define side walls of outermost ones of the converging channels 44, also define a reduced passage 76 at one end of the triangular exit cavity 48. The inner wall section 74 of the mounting portion 36 extends beyond the reduced passage 76 of the exit cavity 48 to define a ribbon-forming support surface 78 to which the first flexible strip 18 may be secured to facilitate the forming of the ribbon unit 22. The outermost rib 42 terminates at the reduced passage 76 of the exit cavity 48 to define an open area 80 which facilitates ready access to the ribbon-forming support surface 78.

A retaining portion, designated generally by numeral 82, of each channel 44 is formed adjacent the entry end 46 of the transition device 10 for retaining respective ones of the light conductors 24 in the channel upon insertion of the light conductors therein. The retaining portion 82 includes sets of opposed enlarged projections 84 formed on the side walls 54 and 56 of the channel entry section 52, which define opposed conductor-receiving seats 86 for receiving the insulated light conductors 24 therein.

Referring to FIG. 3, to form the ribbon unit 22 utilizing the transition device 10, each of the light conductors 24 is first prepared by stripping portions of the inner and outer insulation layers 14 and 16, respectively, from one end of the conductor such that a preselected length of the light-conductive glass fiber 12 is exposed, and such that an exposed portion of the inner layer of insulation, corresponding approximately to the length of the channel intermediate sections 58, extends beyond a leading edge 88 of the outer layer of insulation. A preselected length of the first adhesive strip 18, corresponding substantially to the length of the stripped portions of the light-conductive glass fibers 12, also is secured to the ribbon-forming support surface 78 of the transition device 10, by an epoxy material or similar substance, such that portions of the strip extend outwardly from the ribbon-forming support surface as shown in FIG. 3.

As is best shown in FIG. 3, the light conductors 24 next are placed one-by-one into the channels 44 such that the leading edges 88 of the outer insulating layers 16 and leading edges 90 of the inner insulation layers 14 essentially abut respective ones of the stops 70 and 72 and respective ones of the stop surfaces 60 and 68 of the channel entry and intermediate sections 52 and 58, respectively. The insulated portions of the light conductors 24 also are pressed between the opposed projections 84 of the retaining portion 82 and into the conductor-receiving seats 86 thereof to retain and anchor the conductors in place in the transition device 10.

As the insulated light conductors 24 are placed into their respective channels 44 one-by-one, the stripped portions of the glass fibers 12 of the conductors are threaded through the reduced passage 76 and positioned side-by-side in a designated order onto the first adhesive strip 18. In this connection, after each of the light conductors 24 has been positioned in its respective channel 44, the first adhesive strip 18 may be positioned on a flat surface of a support 91 as illustrated in FIG. 3, to facilitate positioning of the stripped glass fiber 12 onto the strip.

After the stripped portions of the glass fibers 12 have been properly positioned on the adhesive strip 18, the second adhesive strip 20, having a length substantially equal to the length of the first adhesive strip 18 and the length of the stripped portions of the glass fibers, and which forms the other side of the ribbon unit 22, initially is positioned in the open area 80 of the transition device 10 onto the portions of the glass fibers 12 supported on the forming surface 78 by the first adhesive strip 18. The remaining length of the adhesive strip 20 is then pressed into engagement with the planar array of the stripped portions of the glass fibers 12 and the first adhesive strip 18, thereby encapsulating the planar array of the glass fibers between the two strips and forming the ribbon unit 22.

After the ribbon unit 22 has been formed, the channels 44 and the exit cavity 48 of the transition device 10 are filled with an epoxy material 92, as shown in FIG. 1. The portion of the ribbon unit 22 secured to the ribbon-forming surface 78 of the transition device 10 is also covered with the epoxy material 92, as shown in FIG. 1, to further anchor the ribbon unit to the device. This procedure encapsulates the light conductors 24 in place in the transition device 10 to form an optical fiber assembly, designated generally by the numeral 93, wherein the plurality of light conductors extend from the entry end 46 of the device and ribbon unit 22 extends from the exit end 50 of the device. As a result of encapsulating, any tension on the light conductors 24 at the entry end 46 of the device 10 is not transmitted to the ribbon unit 22 at the exit end 50 of the device and thus the optical fiber assembly 93 provides a strain relief for the portions of the light-conductive fibers 12 in the ribbon unit.

The ribbon unit 22 of the optical fiber assembly 93 and one of the ribbon units 30 of the optical fiber cable 32 can now be connected to respective portions of the array connector 34 in a process similar to that described in the above-mentioned U.S. Pat. No. 3,864,018. Thus, it can be seen that the transition device 10 facilitates the forming of the ribbon unit 22, which in turn facilitates the optical connection of the glass fibers 12 of the individual light conductors 24 to the glass fibers 28 of the ribbon unit 30 without disturbing the integrity of the ribbon unit of the cable 32.

Referring to FIGS. 1, 2 and 3, to facilitate mounting the transition device 10 in the assembly housing 38, the mounting portion 36 of the device includes a pair of slots 94 and 96 formed at respective ones of the opposite ends 46 and 50 of the device. Referring to FIG. 1, the slots 94 and 96 cooperate with a pair of spaced retaining bars 98 and 100 secured to a side wall 102 and an intermediate wall 104 of the assembly housing 38, as shown at the left-hand side of the housing in this figure. An identical pair of retaining bars (not shown) are provided at the right-hand side of the assembly housing 38, as viewed in FIG. 1, between the intermediate wall 104 and a second side wall (not shown). Dividing plates 106 extend parallel to the walls 102 and 104 to define a plurality of receiving areas 108 each dimensioned slightly wider than the thickness of the transition devices 10, for receiving an individual one of the transition devices therein.

The transition device 10 is mounted into the assembly housing 38 (FIG. 1) by moving the device into a selected one of the receiving areas 108 and successively positioning the slots 94 and 96 onto the adjacent retaining bars 98 and 100. Once the lower slot 94 (FIG. 1) of the device 10 is seated onto the retaining bar 98, the device is restricted from inward or outward movement. After all of the transition devices 10 to be mounted in the assembly housing 38 have been properly positioned onto the retaining bars 98 and 100 of the housing, as shown at the right-hand side of FIG. 1, an elongated rod 110 is extended through an aperture 112 in each of the side walls 102, aligned apertures (not shown) in the dividing plates 106, apertures 114 of the mounting portions 36 of the transition devices, and an aperture (not shown) in the intermediate wall 104 of the housing, to lock the devices, and thus the optical fiber assemblies 93, into the housing.

In summary, each of the transition devices 10, when assembled to form one of the optical fiber assemblies 93, includes a plurality of the individual light conductors 24 extending into the entry end 46 of the device and one of the lightguide ribbon units 22 extending from the exit end 50 of the device. The resulting optical fiber assembly 93 facilitates the handling of the individual insulated light conductors 24 and further facilitates the optical connection of the individual light conductors to the light-conductive fibers 28 of one of the ribbon units 30 of the optical fiber cable 32 by means of one of the array connectors 34, without disturbing the integrity of the ribbon unit.

In forming the ribbon unit 22, the first adhesive strip 18, which forms one side of the ribbon unit, is secured to the ribbon-forming supporting surface 78 of the transition device 10 adjacent the exit end 50 of the transition device so that the strip extends outwardly therefrom. The light conductors 24, portions of which have been stripped of the insulation layers 14 and 16, then are placed and secured into the converging channels 44 of the transition device 10 as shown in FIG. 3 such that the stripped portions of the light-conductive fibers 12 extend through the reduced passage 76 and outward from the exit end 50 of the device, where the fibers are positioned onto the first adhesive strip 18 in a side-by-side planar array. The second adhesive strip 20 is then brought into longitudinal engagement with the array of fibers 12 and the first adhesive strip 18, thereby encapsulating the fibers between the two strips and forming the ribbon unit 22. Subsequently, the channels 44, the triangular cavity 48, and the open area 80 over the ribbon-forming support surface 78, are filled with the epoxy 92 to permanently anchor respective portions of the light conductors 24 and the ribbon unit 22 in the transition device 10. The completed optical fiber assembly 93 then may be mounted in the assembly housing 38 (FIG. 1).

What is claimed is:

1. A transition device for use in forming a fiber ribbon cable unit from a plurality of individual fibers, which comprises:
   a support block;
   a plurality of spaced elongated ribs formed in the support block and defining a plurality of fiber-receiving channels which converge toward one another from a spaced relationship at an entrance end of the block to a closely adjacent relationship substantially adjacent an exit end of the block; and
   converging inner wall sections formed in the support block and defining side walls of outermost ones of the converging channels defined by the elongated ribs, one of the inner wall sections extending to the exit end of the block to define a fiber ribbon support surface and the other of the inner wall sections terminating in spaced relationship from the exit end of the block to provide access to the fiber ribbon support surface.

2. A transition device as recited in claim 1, in which each of the fiber-receiving channels includes a stepped bottom surface which defines at least one stop surface for an end of an insulated portion of a fiber.

3. A transition device as recited in claim 1, in which: each of the fiber-receiving channels includes first and second sections of different widths for receiving an insulated portion of a fiber and an insulation-stripped portion of the fiber, respectively, with each channel also including stop surfaces for an end of the insulated portion of the fiber at the junction of the first and second channel sections.

4. A transition device as recited in claim 3, in which: each of the fiber-receiving channels includes a third section of greater width than the first and second sections of the channel for receiving a portion of a fiber having an additional insulation layer thereon, with each of the channels also including stop surfaces for an end of the additional insulation layer at the junction of the second and third channel sections.

5. A transition device as recited in claim 1, in which: the fiber-receiving channels includes opposed space projections at the entrance end of the support block which define opposed fiber-receiving seats at the entrance end of the support block.

6. An optical fiber assembly comprising:

a transition device of one-piece essentially planar construction for converting optical fibers from an individual configuration to a ribbon cable configuration, the transition device including fiber-receiving channels which extend from one end of the transition device to substantially an opposite end of the device in converging relationship; and a plurality of optical light-conductive fibers having first portions disposed in the channels in the transition device, second substantially elongated portions extending from the one end of the transition device in an individual configuration for connection to associated equipment, and third substantially elongated portions projecting from the opposite end of the transition device in a ribbon cable configuration for connection to another ribbon cable.

7. An optical fiber assembly as recited in claim 6, wherein said individual fibers at the one end of the fiber-receiving transition device are surrounded by insulation.

8. An optical fiber assembly as recited in claim 6, wherein portions of the fibers are encased in the fiber-receiving transition device by an encapsulating material.

9. An optical fiber assembly as recited in claim 6, wherein the fiber-receiving device includes open-ended slot means at respective ones of the opposite ends of the device for mounting the assembly on a support.

* * * * *